April 23, 1963 L. ZIMMERMANN 3,086,410

TREPANNING TOOL

Filed Jan. 23, 1961 2 Sheets-Sheet 1

INVENTOR.

LUKAS ZIMMERMANN

BY

Everett E. Wright

ATTORNEY

TREPANNING TOOL

Filed Jan. 23, 1961

INVENTOR.
LUKAS ZIMMERMANN
BY
Everett G. Wright
ATTORNEY

United States Patent Office 3,086,410
Patented Apr. 23, 1963

3,086,410

TREPANNING TOOL

Lukas Zimmermann, 5755 Bloomfield Glens Road, Birmingham, Mich.

Filed Jan. 23, 1961, Ser. No. 84,245
2 Claims. (Cl. 77—69)

This invention relates to cutting tools and in particular to trepanning tools.

For the purpose of this application, trepanning is best defined as a cutting operation which produces in a finished work piece an annular recess providing a cylindrical boss located concentrically within a cylindrical bore.

The primary object of the invention is to provide an improved trepanning tool which produces accurate finished work pieces with great economy.

Another object of the invention is to provide an extremely efficient and economical tool for performing trepanning operations that effectively handles the chips from deep trepanning cuts and which is readily sharpened by simple conventional tool sharpening procedures.

Other objects of the invention will become apparent by reference to the following detailed description taken in connection with the accompanying drawings, in which.

Figure 1:
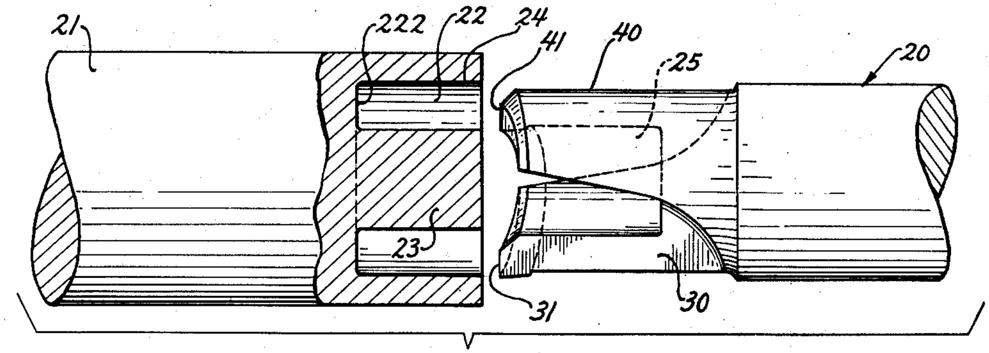
FIG. 1 is an exploded view showing a trepanned work piece with a trepanning tool embodying the invention removed therefrom.
Figure 3:
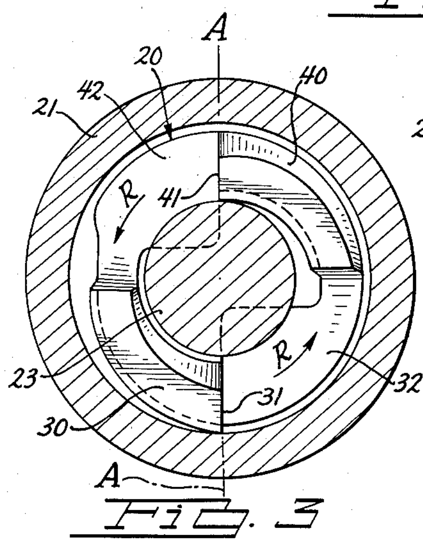
FIG. 3 is a cross sectional view taken on the line 3—3 of FIG. 2.

Referring now to the drawings, and in particular to FIGS. 1–9 inclusive, an illustrative embodiment of a trepanning tool 20 is disclosed which makes a trepanned cut in a work piece 21, the said cut providing an annular recess 22 between a cylindrical boss 23 centrally disposed in a cylindrical bore 24 and the wall of said cylindrical bore 24.

To accomplish the trepanned cut, the work piece 21 may be rotatably held while the trepanning tool 20 is fixedly mounted in axial aligned or axial offset relationship with respect to the center of the trepanned cut, according to whether or not the trepanning tool 20 has been sharpened. Of course, the trepanning tool 20 may be rotated while the work piece 21 is fixed. In either instance, a proper axial feed of the trepanning tool into the work is required. The trepanning operation may be accomplished on a lathe or other machine tool incorporating means for holding the work, means for holding the trepanning tool, means for rotating the work with respect to the trepanning tool, or vice versa, while advancing the tool axially toward and into the work, and means for offsetting the axial alignment of the center line of the trepanning tool in respect to the center line of the trepanning cut.

As shown throughout FIGS. 1–9 inclusive the cutting end of the trepanning tool 20 is axially hollow at 25 and is bifurcated forming two arcuate cutting arms or elements 30 and 40 having cutting teeth 31 and 41 respectively located in a diametrical plane "A—A" through the longitudinal axis of the said tool.

Figure 2:
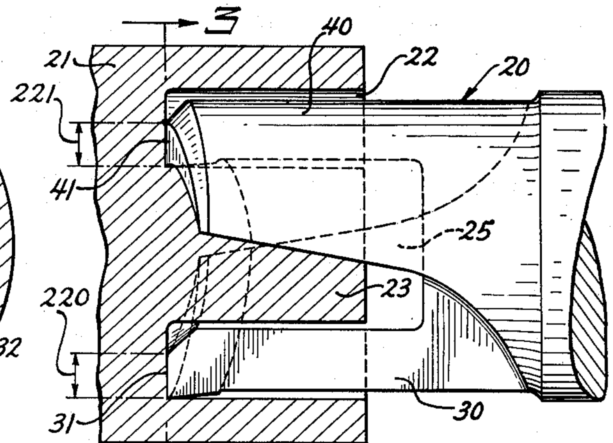
FIG. 2 is an enlarged longitudinal sectional view of a work piece with the trepanning tool embodying the invention positioned in cutting relationship therewithin.
Figure 5:
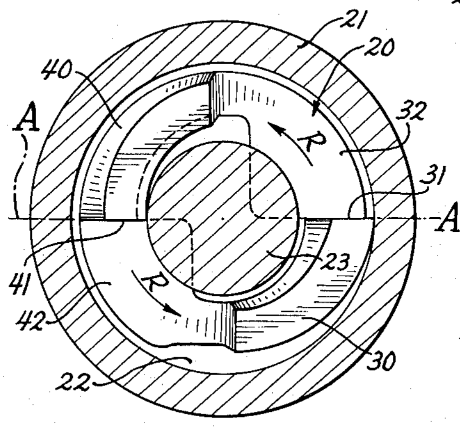
FIG. 5 is a cross sectional view taken on the line 5—5 of FIG. 4.
Figure 4:
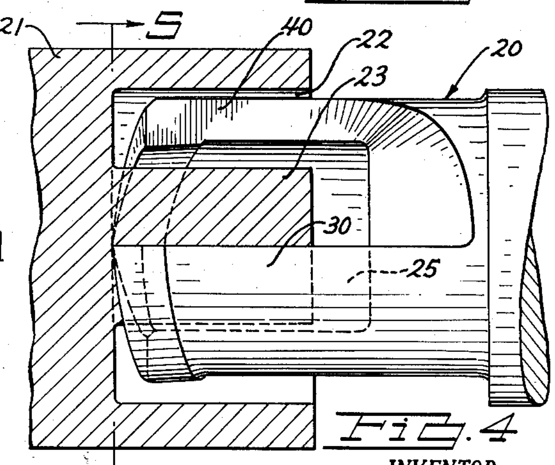
FIG. 4 is a longitudinal sectional view of a work piece similar to FIG. 2 with the improved trepanning tool positioned in cutting relationship therewithin but with the trepanning tool turned 90 degrees from its position shown in FIG. 2.

It will be observed that the cutting tooth 31 is shaped to perform as a boring tool, and, as the trepanning tool 20 is fed axially into the work, the cutting tooth 31 will bore the diameter "*a*" of the cylindrical bore 24 forming the outer annular portion 220 of the annular recess 22 as indicated in FIG. 2. Simultaneously the cutting tooth 41, which is shaped to perform as a turning tool, turns the diameter "*b*" of the cylindrical central boss 23 forming the inner annular portion 221 of the annular recess 22 as indicated in FIG. 2. In other words, the said cutting teeth 31 and 41 combine to cut the annular recess 22 and finish the annular bottom 222 thereof, each cutting tooth 31 and 41 cutting the outer and inner annular portion of the recess 22 in simultaneous progression from the top to the bottom of the said recess 22. It is essential that each of the cutting teeth 31 and 41 are over fifty percent of the width of the annular bottom of the trepanned cut or are of a combined width greater than the annular bottom 222 of the recess 22.

During the aforedescribed cutting operation, the material removed from work piece 21 to form the annular recess 22 is divided into two parts or chip ribbons, the cutting tooth 31 removing an outer chip ribbon leaving the tool through the chip slot 32 and the cutting tooth 41 removing an outer chip ribbon leaving the tool through the chip slot 42. Although the chips from the two cutting teeth 31 and 41 have been described as chip ribbons, in practice these so-called ribbons easily break up, and, because they each are of less width than the annulus of the annular recess 22, they readily leave the trepanning tool through the chip slots 32 and 42 and at the same time provide abundant room for cutting fluid to enter and leave the annular recess 22 as it is being formed. The chip slots 32 and 42 respectively constitute the space between the cutting arms 30 and 40 rotationally ahead of the face of the cutting teeth 31 and 41, see FIG. 3.

By reference to FIGS. 2–5 inclusive, it will be observed that the cutting teeth 31 and 41 are preferably shaped along spiral-helical curves to provide the necessary radial and end clearances between the tool and the cut surfaces of the work piece 21. In other words, each cutting tooth 31 and 41 is generated to the desired cross sectional shape advancing along a combination spiral-helical curve by a combined rotary and translatory motion selected to keep the generated surface always in a common plane with the longitudinal axis of the trepanning tool. In the foregoing respect, the cutting tooth 31 of the trepanning tool 20 illustrating the instant invention is preferably formed in a similar manner to the cutting tool disclosed in Patent No. 2,556,745 issued on June 12, 1951, to Lukas Zimmermann, the applicant herein.

The cross sectional shape of the cutting tooth 41 of the said trepanning tool 20 is preferably formed in a similar manner to the said cutting tooth 31 but reversed to cause the said tooth 41 to function as a turning tool. Therefore, in the instant invention, the cutting tooth 31 functions similar to a boring tool while the cutting tooth 41 functions similar to a turning tool, the former removing the outer portion 220 of the trepanned cut and the latter removing the inner portion 221 of the trepanned cut, both simultaneously as the trepanning tool 20 is advanced into the work piece 21 and tool 20 or work piece 21 is rotated to provide in effect a rotation "R" of the tool 20 with respect to the work piece 21.

To sharpen a trepanning tool 20, it is ground at the cutting faces of the cutting teeth 31 and 41 diametrically across the diametrical plane "A—A," and can be resharpened frequently taking away additional tool stock up to the diametrical plane "B—B" leaving only sufficient stock in each cutting arm 30 and 40 to provide adequate strength for the trepanning tool 20 to perform its function without breakage. Accordingly, it is obvious by reference to FIG. 6 that a trepanning tool 20 can be sharpened a great number of times which assures an extremely long tool life. The resharpening is accomplished in a manner similar to that employed in sharpening conventional circular form tools.

It is important to note that the cutting faces of the cutting teeth 31 and 41 are 180 degrees apart, and, in resharpening the trepanning tool 20, this 180 degree angular relationship of cutting faces of the cutting teeth 31 and 41 must be maintained.

Figure 6:
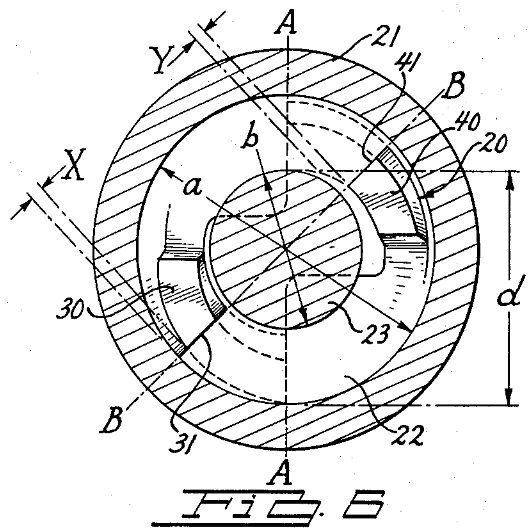
FIG. 6 is a cross sectional view through a trepanned work piece with a sharpened trepanning tool embodying the invention disposed in the trepanned cut indicating how a trepanning tool of the invention is readily sharpened.

To be assured that a trepanning tool 20 will cut accurately the diameter "$a$" of the cylindrical bore 24 and the diameter "$b$" of the cylindrical boss 25 as indicated in FIG. 6, it is necessary that the diametric distance "$d$" between the outer cutting edge of the cutting tooth 31 and the inner cutting edge of the cutting tooth 41 be equal $\frac{1}{2}a$ plus $\frac{1}{2}b$.

When applied to the work piece 21, the cutting tooth 31 will bore accurately the cylindrical bore 24 while the cutting tooth 41 will turn accurately the cylindrical boss 23, and both cutting teeth 31 and 41 will cut accurately the annular bottom 222 of the annular recess 22.

To maintain the aforementioned performance throughout the life of the trepanning tool, it is essential that the spiral-helical relief of the two cutting teeth 31 and 41 be of precisely the same magnitude.

Referring now to FIG. 6, let it be assumed that, by repeated sharpening, the cutting edges of the cutting teeth 31 and 41 which were originally located on the diametrical plane "A—A" have been brought to the diametrical plane "B—B." This, of course, decreases the radius vector of the tooth 31 by the distance "$x$" and increases the radius vector of the tooth 41 by the distance "$y$."

The combined spiral-helical curves of the cutting teeth 31 and 41 are generated in such a manner that, for any diametrical plane through the longitudinal axis of the trepanning tool 20, the increments "$x$" and "$y$" will be equal. Therefore, when the cutting teeth 31 and 41 are resharpened so that a 180 degree angular relationship of the faces of the said cutting teeth 31 and 41 are maintained, the distance between the radial cutting edges will be maintained at $\frac{1}{2}a$ plus $\frac{1}{2}b$.

After each resharpening of a trepanning tool 20 embodying the invention, it is necessary to bring the said resharpened trepanning tool 20 in a proper axial offset position in respect to the work piece 21. This requires two separate machine adjustments.

First, the trepanning tool 20 must be rotated about its own axis to bring the line B—B on a vertical axis. This position is illustrated in FIG. 7.

Figure 7:
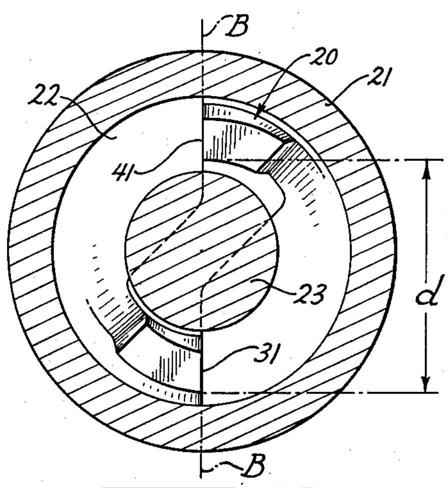
FIG. 7 is a cross sectional view similar to FIG. 6 showing the extent to which a trepanning tool embodying the invention may be cut away by repeated sharpenings, thusly providing an indication of the extremely long useful life of the improved trepanning tool.
Figure 9:
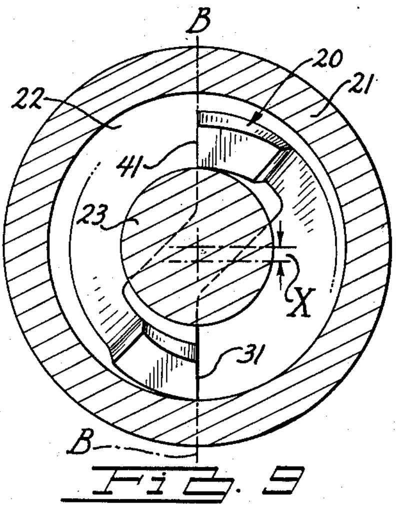
FIG. 9 is a cross sectional view taken on the line 9—9 of FIG. 8.
Figure 8:
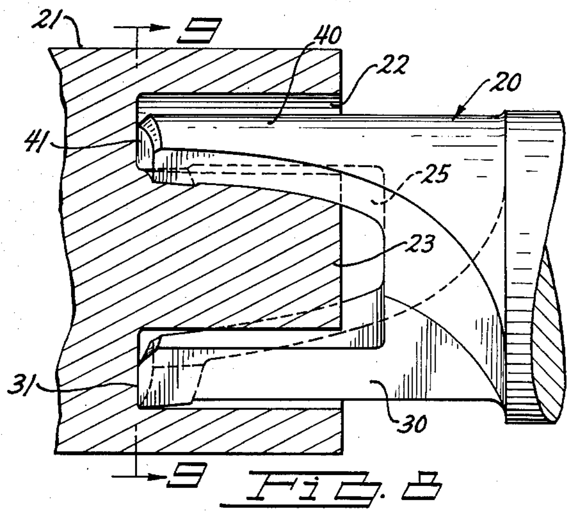
FIG. 8 is a longitudinal sectional view similar to FIG. 2 showing how a trepanning tool embodying the invention is offset with respect to the central boss and cylindrical bore of a work piece to accomplish a trepanning cut to produce accurately and simultaneously a central boss and a cylindrical bore.

Secondly, the machine slide upon which the trepanning tool 20 is rotatably mounted is moved along the line B—B from its position shown in FIG. 7 a distance equal to "$x$," which is equal to "$y$," which movement will bring the resharpened trepanning tool 20 in its proper working position as shown in FIGS. 8 and 9. In such position, the sharpened tooth 31 will bore the outer annular portion of the annular recess 22 while the sharpened tooth 41 will turn the inner annular portion of the said annular recess 22.

Figure 10:
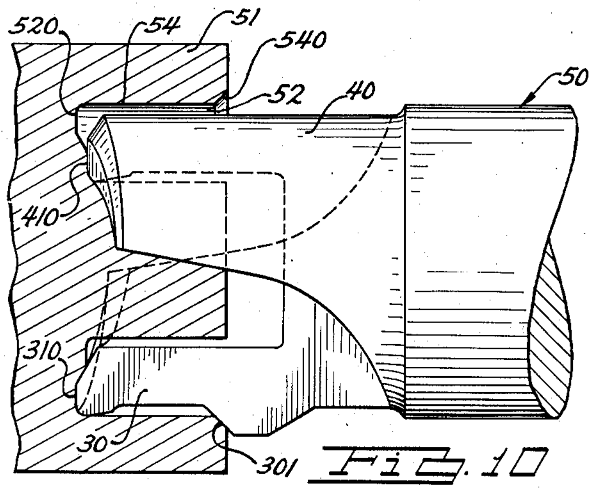
FIG. 10 is a longitudinal sectional view similar to FIG. 9 showing how a trepanning tool shown in FIGS. 1–9 inclusive can be formed to provide, for example, a shaped rather than a flat bottom to a trepanned cut, and a chamfer at the outer edge of the cylindrical wall of the trepanned cut, all while performing the trepanning operation.

Referring now to FIG. 10, it will be observed that, by suitably shaping the axial end of the cutting teeth 310 and 410 of the trepanning tool 50 disclosed therein, and/or by suitably forming the cutting arm 30 of the said trepanning tool 50 at 301, the annular bottom 520 of the annular recess 52 of the work piece 51 and the outer edge 540 of the wall of the cylindrical bore 54 of the said work piece 51 may be shaped and/or chamfered respectively. Otherwise, the trepanning tool 50 is like and similar to the illustrative embodiment of the invention disclosed in FIGS. 1–9 inclusive.

It is obvious that many changes may be made in the size, shape and arrangement of the various elements of a trepanning tool embodying the invention, all without departing from the spirit and scope of the invention as defined by the appended claims.

I claim:

1. A cutting tool for performing trepanning operations having a cutting head bifurcated on its longitudinal axis providing a pair of cutting elements spaced 180 degrees apart, said cutting elements being formed on combined spiral-helical curves each having a cutting tooth with the face thereof disposed in the direction of cutting rotation of said cutting tool, one cutting element being formed to cut the outer portion of the trepanning cut spiraling inwardly therefrom, the other cutting element being formed to cut the inner portion of the trepanning cut spiraling outwardly therefrom, and the axial ends of said cutting elements being formed to cut the bottom of the said trepanning cut.

2. A cutting tool for performing trepanning operations comprising a shank and an axially bifurcated head providing a pair of cutting elements spaced 180 degrees apart, said cutting elements being formed on combined spiral-helical curves each having a cutting tooth disposed on a radial line through the transverse center of said cutting head and faced in the direction of cutting rotation of said cutting tool, one cutting element being formed to provide a cutting tooth for cutting the outer portion of the annulus of a trepanning cut, the other cutting element being formed to provide a cutting tooth for cutting the inner portion of the annulus of the trepanning cut, the spiral helical relief of both cutting teeth being precisely of the same magnitude, and the axial ends of said cutting tool being formed to cut the bottom of the said trepanning cut with each cutting element cutting the bottom of said cut in overlapped relationship to the portion cut by the other.

References Cited in the file of this patent

UNITED STATES PATENTS

| | | |
|---|---|---|
| 476,312 | Resche | June 7, 1892 |

FOREIGN PATENTS

| | | |
|---|---|---|
| 593,622 | Great Britain | Oct. 22, 1947 |